United States Patent Office 3,514,495
Patented May 26, 1970

---

3,514,495
PREPARATION OF 4-NITROSTILBENES
William R. Ruby, Rensselaer, N.Y., assignor to GAF Corporation, New York, N.Y., a corporation of Delaware
No Drawing. Filed July 5, 1968, Ser. No. 742,547
Int. Cl. C07c 79/10, 79/12
U.S. Cl. 260—645                      8 Claims

ABSTRACT OF THE DISCLOSURE

Process for the preparation of 4-nitrostilbenes by reaction of a 4-nitrotoluene with an aromatic aldehyde in the presence of a basic catalyst comprising an alkali metal or alkaline earth metal salt of a phthalimide and potassium carbonate.

---

BACKGROUND OF THE INVENTION

Field of the invention

This invention relates to an improved method of preparing 4-nitrostilbenes and in particular relates to the preparation of 4-nitrostilbenes by condensation of a 4-nitrotoluene with an aromatic aldehyde in the presence of an alkali or alkaline earth metal salt of a phthalimide as basic catalyst and in the presence of potassium carbonate.

Description of the prior art 4-nitrostilbenes represent a class of compounds well known in the prior art which have become valuable in recent years in several areas, and particularly useful in the production of fluorescent brightening agents. In view of their increasing use, a great deal of research has been expended in efforts to find attractive procedures of manufacture, particularly from the standpoint of economics. Accordingly, the present process has been devised to satisfy these needs.

F. Ullmann and M. Gschwind (Berichte 41,2291–7) describe a method of condensing 4-nitrotoluenes, which are substituted in the 2-position by an electronegative group, with aromatic aldehydes. The condensation is effected by employing piperidine as an alkaline condensing agent. The authors specifically state that they were unable to get stilbene formation when an attempt was made to condense 4-nitrotoluene per se, in the case where there is no electronegative substituent in the 2-position of the 4-nitrotoluene, with benzaldehyde under similar conditions.

More recently, in U.S. Pat. 2,657,228, there is described a method of making 4-nitro-2-stilbenesulfonic acids employing aryl esters of 2-methyl-5-nitrobenzenesulfonic acids as the 4-nitrotoluene component wherein catalysts such as secondary saturated amines, particularly piperidine were used. Also, in U.S. Pat. 2,821,550, there is described a method for the direct synthesis of 4-nitro-2-stilbenesulfonic acids by condensation of benzaldehyde and 2-methyl-5-nitrobenzenesulfonic acid in the presence of a secondary amine as catalyst. In these latter two references, as in the Berichte reference, the position ortho to the methyl group of the 4-nitrotoluene is occupied by an electronegative group, but when this same position is not substituted by an electronegative group, none of these methods operate to give a practical yield of desired stilbene compound.

Furthermore, it is known that strongly basic compounds such as sodium hydroxide and sodium methoxide will act as catalysts in the condensation of 4-nitrotoluene and benzaldehyde to give a stilbene even though there is no electronegative substituent ortho to the methyl group of the 4-nitrotoluene. However, the yields obtained thereby are intolerable.

A further improvement in the condensation of a 4-nitrotoluene with a benzaldehyde in the production of 4-nitrostilbenes was the use as alkaline catalyst of an alkali and alkaline earth metal salt of arylsulfonamides. This method is the subject of U.S. Pat. 3,213,132. This method was further modified in U.S. Pat. 3,201,481 wherein the alkaline catalyst is an alkali or alkaline metal salt of an arylsulfonamide with an alkali carbonate additionally added. However, the expense of using these catalysts has precluded their wide acceptance in 4-nitrostilbene production.

It is therefore clear that a distinct need remains in the art for a process which is commercially attractive for the production of 4-nitrostilbenes by condensation of a 4-nitrotoluene and an aromatic aldehyde wherein inexpensive and readily available reactants and catalysts may be utilized.

SUMMARY OF THE INVENTION

It is accordingly one object of the present invention to provide an improved process for the production of 4-nitrostilbenes which overcomes or otherwise mitigates the problems of the prior art.

Another object of the present invention is to provide an improved process for the production of 4-nitrostilbenes in good yields by reaction of a 4-nitrotoluene and an aromatic aldehyde in the presence of an inexpensive and readily available basic catalyst comprising alkali and alkaline earth metal salts of phthalimides and potassium carbonate.

Other objects and advantages of the present invention will become apparent as the description thereof proceeds.

In satisfaction of the foregoing objects and advantages, there is provided by this invention an improved process for the preparation of 4-nitrostilbenes by reaction of a 4-nitrotoluene with an aromatic aldehyde in the presence of a member selected from the group consisting of alkali metal and alkaline earth metal salts of phthalimides and mixtures thereof and potassium carbonate.

DESCRIPTION OF PREFERRED EMBODIMENTS

In practicing the process of the present invention, a 4-nitrotoluene and an aromatic aldehyde are mixed with an alkali or alkaline earth metal salt of a phthalimide and the potassium carbonate, and heated under condensation conditions in an inert solvent which provides at least a limited degree of mutual solubility of the aldehyde, 4-nitrotoluene and phthalimide salt catalyst. Under these conditions, the condensation reaction proceeds smoothly resulting in the formation of the desired 4-nitrostilbene. The reaction can be exemplified by the following equation illustrating the condensation of benzaldehyde with 4-nitrotoluene using the potassium salt of phthalimide as a catalyst:

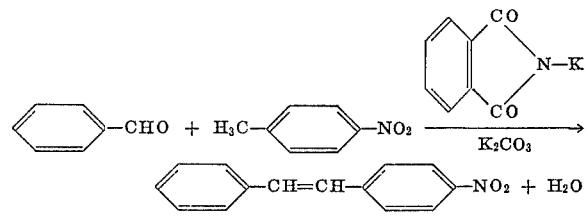

The phthalimide catalysts which are used in practicing the present invention are the alkali and alkaline earth metal salts of phthalimide per se and those which may have further substituents such as alkyl, e.g. methyl, ethyl, dimethyl; halogen, such as chloro or bromo; nitro, alkoxy, such as methoxy, ethoxy, butoxycyano; sulfonamide; carboxamide; and substituted sulfonamide and carboxamide; carbalkoxy, such as carbomethoxy, carboethoxy and the like. The alkali and alkaline earth metal salts comprise sodium, potassium, calcium and magnesium.

Typical phthalimide catalysts whose alkali and alkaline earth metal salts have been found useful as catalysts in practicing the present invention comprise the following:

phthalimide
3-chlorophthalimide
4-chlorophthalimide
3,4-dichlorophthalimide
3-bromophthalimide
3-nitrophthalimide
3-methylphthalimide
4-methylphthalimide
trimellitic imide-4-amide
trimellitic imide-4-(dimethylamide)
4-cyanophthalimide
3-methoxyphthalimide
4-methoxyphthalimide
3-ethoxyphthalimide
3-butoxyphthalimide
3-carboethoxyphthalimide
phthalimide-3-sulfonamide
phthalimide-3-(dimethylsulfonamide)

The phthalimide salt catalysts may be easily prepared by treating the desired phthalimide in a reaction vessel with an equivalent amount or up to a 10% excess of the appropriate alkali metal or alkaline earth hydroxide. The reaction may be effected by heating the mixture at about 40° to 70° C. for a period of time such as 15 minutes to several hours until salt formation occurs. The period for formation of the salt will of course depend on the reactants selected. A particular advantage of the phthalimide salt catalysts is that they may be formed in the reaction medium just prior to addition of the aldehyde and 4-nitrotoluene thus not requiring a separate isolation step for the catalysts. Of course, the catalysts may be isolated prior to use if desired.

The aromatic aldehyde reactant employed may be benzaldehyde per se as well as substituted benzaldehydes and naphthaldehydes, it being understood of course, that if a substituted aldehyde is employed, a correspondingly substituted stilbene will be produced. The aromatic aldehydes which may be employed in practicing the present invention for reaction with 4-nitrostilbene may be represented by the following general formulae:

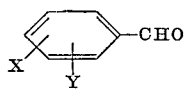

or

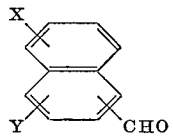

wherein X and Y each represent hydrogen or substituents each as halogen, e.g. chlorine or bromine, nitro, nitrilo, lower alkyl (e.g. methyl or ethyl), —COOH, —SO$_3$H, alkoxy (e.g. methoxy, ethoxy and the like), carboxamide, sulfonamide and substituted carboxamides and sulfonamides and the like.

Specific aromatic aldehydes include the following:

benzaldehyde
o-, m- and p-chlorobenzaldehyde
2,4-, 2,5- and 2,6-dichlorobenzaldehyde
o-, m- and p-bromobenzaldehyde
o-, m- and p-nitrobenzaldehyde
2,4-dinitrobenzaldehyde
o-, m- and p-formylbenzenesulfonic acid
n,N-dimethyl-o-, m- and p-formylbenzenesulfonamide
5-chloro-2- formylbenzenesulfonic acid
o- and p-formylbenzoic acid
m-nitrilobenzaldehyde
alpha- or beta-naphthaldehyde
p-formylbenzamide
n,N-dimethyl-p-formylbenzamide
p-carbethoxybenzaldehyde As to the 4-nitrotoluene reactant, it is to be appreciated that 4-nitrotoluene per se or substituted 4-nitrotoluenes may be employed in practicing the present invention, it being understood that when a substituted 4-nitrotoluene is employed a correspondingly substituted 4-nitrostilbene will be produced as the product. The 4-nitrotoluenes which can be employed in practicing the present invention may be illustrated by the following general formula in which X and Y are as defined above:

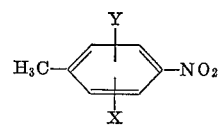

Specific 4-nitrotoluenes which may be employed are the following:

4-nitrotoluene
2-chloro-4-nitrotoluene
2-bromo-4-nitrotoluene
5-nitro-o-toluenesulfonic acid
N,N-dimethyl-5-nitro-o-toluenesulfonamide
5-nitro-o-toluic acid
6-nitro-m-toluic acid
5-nitro-o-toluamide
N,N-dimethyl-5-nitro-o-toluamide
3-nitro-p-tolunitrile
2-carbethoxy-4-nitrotoluene As previously mentioned, and as illustrated by the above list of 4-nitrotoluene compounds, it should be emphasized that the use of the alkali and alkaline earth metal salts of phthalimides as condensation catalysts is beneficial in the reaction of benzaldehydes or naphthaldehydes with 4-nitrotoluenes including those containing an electronegative substituent in the ortho position to the methyl substituent and those which do not contain an electronegative substituent). For example, if 5-nitro-1-toluenesulfonic acid, which contains an electronegative group ortho to the methyl radical is used, the reaction will occur regardless of whether piperidine or other prior art amines or the catalysts of this invention are employed. However, if the catalysts of this invention are used, a lower temperature and a shorter reaction time can be used. It is in the case where the reactant does not contain an electronegative substituent ortho to the methyl group of the 4-nitrotoluene compound that the use of the catalysts of this invention is especially beneficial, since otherwise the reaction will not occur with any degree of satisfaction. It will be understood that if the benzaldehyde, naphthaldehyde or 4-nitrotoluene, employed as a reactant, contains a SO$_3$H or COOH acid salt-forming substituent, it should be employed in the form of its alkali metal, Na or K, salt, rather than in its free-acid form.

The reaction is also advantageously carried out in the presence of potassium carbonate (K$_2$CO$_3$) as this compound has been found to exert an alkalizing effect on the reaction and also serve as a dehydrating agent. The reasons for the efficacy of the potassium carbonate are that it:

(1) Takes up water which may be present initially;
(2) Takes up water which is liberated in the condensation reaction and therefore allows the reaction to proceed more nearly to completion;
(3) Takes up water present and thereby inhibits hydrolysis-ring cleavage of the phthalimide potassium salt catalyst; and
(4) Neutralizes any acid which may be produced during the reaction by air oxidation of the aldehyde and prevents destruction of the phthalide potassium salt by reaction with such acid.

The minimum amount of potassium carbonate which may be employed in the reaction is the amount necessary to take up the water formed during the reaction. In a particularly preferred aspect, an excess should be used to take up any additional moisture which may be present. The amount which should be used is that limited only by an amount beyond which an improvement is noted and/or convenient agitation of the mixture is influenced.

Quite unexpectedly, it has been found that potassium carbonate specifically must be employed in the reaction as any other material, such as sodium carbonate, does not function to provide the same results; accordingly, use of potassium carbonate in the process represents an integral feature of the invention.

As previously mentioned, the condensation of the aromatic aldehyde with the 4-nitrotoluene in the presence of the phthalimide catalysts of the present invention is preferably carried out in the presence of an inert solvent in which the aldehyde, phthalimide salt catalyst and 4-nitrotoluene have at least a limited degree of mutual solubility. The particuar solvent which is employed will depend to a large extent on the substituents (and resulting solubility properties) of the particular aldehyde, 4-nitrotoluene or phthalimide salt catalysts which are employed. When a solubilizing group such as a sulfonic acid group is present in the aldehyde, as for instance in 3-formylbenzenesulfonic acid, but the 4-nitrotoluene employed contains no solubilizing group, as for example when 4-nitrotoluene itself is used, then a sufficient amount of an inert mutual solvent, such as triethanolamine, polyoxyethylene or the like, should be employed in order to bring the reactants into sufficient common solution. When neither the aldehyde nor the 4-nitrotoluene derivatives contains a solubilizing group, it is necessary to introduce a certain amount of solvent so as to bring the salt of the phthalimide into solution with the reagents since the salt of the phthalimide is too insoluble in the mixture of aldehyde and 4-nitrotoluene to bring about such reaction.

The optimum temperature and reaction time for the process depend to a great extent on the nature of the substituent in the 2-position of the 4-nitrotoluene and only slightly on the aldehyde substituents. The temperature may range from about 50° to 150° C. although a temperature above 110° C. is rarely used, since above 110° C. the reaction of 4-nitrotoluene with itself becomes relatively more important, especially when using the alkaline catalysts of this invention. When the 2-position contains a halogen atom such as chlorine, a somewhat lower condensation temperature and shorter reaction time are required than when the 2-position is unsubstituted. When the 2-position contains a strongly electronegative substituent, such as nitrilo or sulfo groups, the reaction proceeds much easier at a lower temperature and shorter time. Also, when the strongly electronegative substituent is in the 2-position, a less basic catalyst like piperidine (as described in the Ullmann reference noted above) can be used but a higher reaction temperature and longer time are required.

The amount of solvent used to produce mutual solubility of aldehyde, catalyst and 4-nitrotoluene, can be varied from about one-third of the amount of either reagent to ten times as much as either reagent. The solvents may be monoalkyl ethers of glycol, dioxane, alcohols, tertiary amines and alkylolamines and in many cases diluents like benzene, ethylene dichloride, and the like. In particular it has been found that the polyethylene glycols and polypropylene glycols are especially effective as solvents. These solvents are prepared by condensing ethylene oxide, propylene oxide and mixtures of ethylene oxide and propylene oxide to form long chain polymers having a molecular weight of from about 100–6000. These products range from liquids to waxlike products, depending on the number of units present, and they may be used alone or in admixture with different polyoxyalkylenes or with other solvents. These products are well known commercially under the trade names of "Gafanol" and "Carbowax," sold by General Aniline & Film Corporation and Union Carbide Corporation, respectively.

Usually the amounts of the reagents employed involves using equimolar amounts of each, but as much as five-fold excess of either reagent may be used especially if it is an inexpensive, readily available material compared with the other reagent. The amount of phthalimide catalyst may vary from about 2 percent to about 25 percent of the amount of the aldehyde, and in fact, the addition of larger amounts of catalyst has little adverse effect.

Use of the described phthalimide catalysts in the process of this invention has a number of advantages, one of the most important being the cost of the catalysts. Phthalimide and its alkali and alkaline earth metal salts are less expensive than those of arylsulfonamides for example. There is also the advantage that the alkali salt and alkaline earth metal salts of phthalimide can be prepared in situ. In other words, a phthalimide may be treated in the reaction vessel with an equivalent or up to 10 percent excess of alkali or alkaline earth hydroxide. On heating to 40–70° C. salt formation occurs. The 4-nitrotoluene and benzaldehyde compound may then be added and the reaction carried out as described. Additionally, the product is obtained in a high degree of purity, and in a good form for excellent filtration.

The details of the present invention will be apparent to those skilled in the art from a consideration of the following examples which illustrate and describe preferred embodiments of the invention.

EXAMPLE I

Fifty-five grams of polyoxyethylene having an average molecular weight of 380–420, 8.5 grams phthalimide and 4.2 grams of potassium hydroxide flakes were mixed and heated quickly to 50° C. under agitation. After 1–1½ hours, 105 grams potassium carbonate was added. After stirring at 50° C. for ½ hour, agitation was stopped and 73.5 grams 4-nitrotoluene and 68.0 grams benzaldehyde were added. The charge was then agitated at 80° C. for 24 hours. The mixture was then poured into 500 grams of water at 80° C., agitated slightly for 1 hour, filtered, rinsed with cold water, then with ethanol, and dried. The yield of 4-nitrostilbene was 87% of theory.

EXAMPLE II

To a reaction flask was charged 80 grams phthalimide in 800 cc. ethanol and boiled about 15 minutes. The hot solution was decanted into a solution of 31.0 grams potassium hydroxide in 30 cc. water and 90 cc. alcohol. This was cooled, filtered and washed with 100 cc. acetone and dried. Gleaming white flaky crystals of potassium phthalimide were obtained.

To a reaction vessel was charged 68.5 grams 4-nitrotoluene, 63.6 grams benzaldehyde and 75 cc. polyoxyethylene having an average molecular weight of about 380–420, 10 grams of the potassium phthalimide, 14 grams potassium carbonate and 50 mg. hydroquinone and heated together at 70° C. for 48 hours. The mixture was then drowned into warm water, filtered, washed with warm water, then methanol, and dried to give 4-nitrostilbene in 84.1% yield. The product was a bright orange free-flowing powder, having a purity of 98.5%, M.P. 157.2–160° C., K value=116.3.

EXAMPLE III

To a 500 cc. reaction flask was charged 68.5 grams 4-nitrotoluene, 63.6 grams benzaldehyde, 75 grams polyoxyethylene having an average molecular weight of about 380–420, 8 grams phthalimide, 3.2 grams potassium hydroxide, 50 mg. hydroquinone and 28 grams potassium carbonate and heated together at 80° C. for 30 hours, the flask being equipped with agitator, thermometer and $CaCl_2$ tube. It was then drowned into warm water, filtered, washed with warm water, then cold water, then cold methanol. Light, bright orange crystals of 4-nitrostilbene were obtained in 84.5% yield, purity 96.4%.

EXAMPLE IV

A Werner and Pfleiderer-type laboratory mixer of approximately 180 cc. capacity was charged with 20 cc. polyoxyethylene having a molecular weight 380–420, 2.07 grams potassium hydroxide, and 3.5 grams phthalimide. These ingredients were mixed at 50° C. for 1 hour, producing a clear solution of potassium phthalimide. To this solution was then added 42 grams potassium carbonate and the mixing at 50° C. continued for one-half an hour more. There was then added to the mixer 30 grams 4-nitrotoluene and 42.2 grams 2,4-dichlorobenzaldehyde. The charge was heated to 80° C. with agitation for 22 hours. It was drowned into 200 cc. water, steam distilled, filtered hot, and washed with warm water, then cold water, then methanol, and dried. The 2′,4′-dichloro-4-nitrostilbene was produced in 92.1% yield having a purity of 97.2%.

EXAMPLE V

A 500 cc. flask was charged with 50 cc. polyoxyethylene having an average molecular weight of about 380–420, 2.07 grams potassium hydroxide and 3.5 grams phthalimide. It was heated at 50° C. with stirring for 1 hour. Then 42 grams potassium carbonate was added and stirring continued for 1 hour at 50° C., 30 grams 4-nitrotoluene and 33.6 grams 4-chlorobenzaldehyde were added and the mixture heated with agitation at 83° C. for 24 hours. Thereafter, 100 cc. of water were added, the mixture filtered, washed with warm water, then cold water and then ethanol. The 4′-chloro-4-nitrostilbene, M.P. 189–194.2° C., was obtained in 79% yield, purity 88.8%.

EXAMPLE VI

In a manner similar to Example 5, 33.6 grams 2-chlorobenzaldehyde as the aldehyde reagent was used. Obtained 2′-chloro-4-nitrostilbene, M.P. 124.6–126.8° C. at 95.6% purity.

EXAMPLE VII

In a reaction flask was placed 40 cc. polyoxyethylene having an average molecular weight of about 380–420, 3.5 grams phthalimide and 2.5 grams potassium hydroxide and heated at 50° C. for one hour. Then 42 grams potassium carbonate was added and stirred at 50° C. for ½ hour. Thereafter 39.8 grams 2-formylbenzenesulfonic acid sodium salt, and 30 grams 4-nitrotoluene were added. This mixture was heated at 80° C. for 24 hours, then 200 cc. water was added, adjusted to 800 cc. volume with water, clarified, extracted twice with 70 cc. toluene, reclarified, salted out, filtered and washed with 110 cc. 10% sodium chloride solution, and dried. Light bright orange crystals of 4′-nitro-2-stilbenesulfonic acid were obtained.

EXAMPLE VIII

The reaction of Example 7 was repeated with the exception that the 4-nitrotoluene was replaced by 47.7 grams 5-nitro-o-toluenesulfonic acid, and 3.5 grams potassium hydroxide was employed. 4-nitro-2,2′-stilbenedisulfonic acid was obtained in excellent yield.

EXAMPLE IX

Example 3 was repeated with the exception that the 3.2 grams potassium hydroxide was replaced by 2.2 grams sodium hydroxide and the 28 grams potassium carbonate was replaced by 22 grams sodium carbonate. 4-nitrostilbene was obtained, not in as good yield, however, as in the case of Example 3.

The present invention has been described with reference to certain preferred embodiments which have been illustrated to clearly define the invention. However it is to be understood that variations can be made in accordance with the teachings of the application without departing from the spirit and scope thereof. Therefore, the invention is to be considered as limited only by the appended claims.

What is claimed is:

1. In a process for the preparation of 4-nitrostilbenes by the condensation, at a temperature of from 50° C. to 150° C. in the presence of an inert solvent, of a 4-nitrotoluene of the general formula:

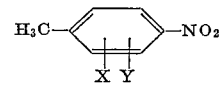

wherein X and Y are selected from the group consisting of hydrogen, halogen, nitro, nitrilo, lower alkyl, —COOH, —SO₃H, alkoxy, carboxamide and sulfonamide, with an aldehyde selected from the group consisting of

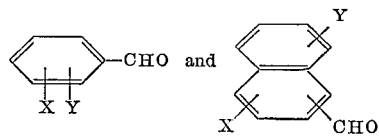

wherein X and Y are as defined above, in the presence of an alkaline condensing agent, the improvement which comprises employing as said alkaline condensing agent potassium carbonate and a basic catalyst selected from the group consisting of an alkali metal salt of a phthalimide, an alkaline earth metal salt of a phthalimide and mixtures thereof.

2. A process according to claim 1 wherein the basic catalyst is a phthalimide salt selected from the group consisting of the sodium salt of a phthalimide, the potassium salt of a phthalimide, the calcium salt of a phthalimide and the magnesium salt of a phthalimide.

3. A process according to claim 1 wherein the phthalimide salt catalyst is selected from the group consisting of the alkali metal and alkaline earth metal salts of phthalimide
3-chlorophthalimide
4-chlorophthalimide
3,4-dichlorophthalimide
3-bromophthalimide
3-nitrophthalimide
3-methylphthalimide
4-methylphthalimide
trimellitic imide-4-amide
trimellitic imide-4-(dimethylamide)
4-cyanophthalimide
3-methoxyphthalimide
4-methoxyphthalimide
3-ethoxyphthalimide
3-butoxyphthalimide
3-carboethoxyphthalimide
phthalimide-3-sulfonamide, and
phthalimide-3-(dimethylsulfonamide)

4. A process according to claim 1 wherein the basic catalyst is present in an amount of about 2% to about 25% based on the weight of the aromatic aldehyde present.

5. A process according to claim 1 wherein the basic catalyst is initially formed in situ in the reaction medium.

6. A process according to claim 1 wherein the aldehyde is benzaldehyde, the 4-nitrotoluene is 4-nitrotoluene and the catalyst is potassium phthalimide.

7. A process according to claim 6 wherein the reaction is carried out in an inert reaction medium comprising a polyoxyalkylene glycol.

8. A process according to claim 1 wherein the potassium carbonate is present in sufficient amount to take up the water formed during the reaction.

References Cited

UNITED STATES PATENTS

| | | | |
|---|---|---|---|
| 3,130,218 | 4/1964 | Cofrancesco | 260—465 |
| 3,201,481 | 8/1965 | Catino et al. | 260—645 |
| 3,213,132 | 10/1965 | Strobel et al. | 260—505 |

OTHER REFERENCES

Ashley et al., J. Chem. Soc. (London), 1946, pp. 567 to 572.

LELAND A. SEBASTIAN, Primary Examiner

U.S. Cl. X.R.

260—465, 505, 507, 515, 556, 558, 612, 646